United States Patent
Huang et al.

(10) Patent No.: US 9,390,042 B2
(45) Date of Patent: Jul. 12, 2016

(54) SYSTEM AND METHOD FOR SENDING ARBITRARY PACKET TYPES ACROSS A DATA CONNECTOR

(75) Inventors: Wei-Je Huang, Fremont, CA (US); Dennis Ma, Austin, TX (US); Hitendra Dutt, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 636 days.

(21) Appl. No.: 13/541,464

(22) Filed: Jul. 3, 2012

(65) Prior Publication Data

US 2014/0013023 A1    Jan. 9, 2014

(51) Int. Cl.
*G06F 13/20* (2006.01)
*G06F 13/38* (2006.01)

(52) U.S. Cl.
CPC .................................. *G06F 13/385* (2013.01)

(58) Field of Classification Search
USPC ....................... 710/305–317, 8–19
See application file for complete search history.

(56) References Cited

U.S. PATENT DOCUMENTS

| | | | | |
|---|---|---|---|---|
| 6,338,108 | B1 * | 1/2002 | Motomura | 710/110 |
| 7,412,588 | B2 * | 8/2008 | Georgiou et al. | 712/33 |
| 8,036,243 | B2 * | 10/2011 | Georgiou et al. | 370/467 |
| 8,473,567 | B2 * | 6/2013 | Mannava et al. | 709/216 |
| 2004/0019733 | A1 * | 1/2004 | Garinger et al. | 710/314 |
| 2007/0088877 | A1 * | 4/2007 | Chen et al. | 710/71 |
| 2010/0329255 | A1 * | 12/2010 | Singhal et al. | 370/392 |
| 2011/0029696 | A1 * | 2/2011 | Uehara | 710/9 |
| 2012/0176909 | A1 * | 7/2012 | Wagh et al. | 370/241 |
| 2013/0346667 | A1 * | 12/2013 | Stroud et al. | 710/316 |

* cited by examiner

*Primary Examiner* — Raymond Phan
(74) *Attorney, Agent, or Firm* — Artegis Law Group, LLP

(57) ABSTRACT

A processing unit exchanges data with another processing unit across a data connector that supports a particular communication protocol. When the communication protocol is updated to support a new packet type, a specification of that new packet type may be stored within software registers included within the processing unit. Under circumstances that require the use of the new packet type, packet generation logic may read the packet specification of the new packet type, then generate and transmit a packet of the new type.

20 Claims, 4 Drawing Sheets

SYSTEM AND METHOD FOR SENDING ARBITRARY PACKET TYPES ACROSS A DATA CONNECTOR

BACKGROUND OF THE INVENTION

1. Field of the Invention

The present invention generally relates to data transmissions, and, more specifically, to a system and method for sending arbitrary packet types across a data connector.

2. Description of the Related Art

A typical data connector, such as a peripheral component interface (PCI) or PCI express (PCIe), allows different processing units within a computer system to exchange data with one another. For example, a conventional computer system could include a central processing unit (CPU) that exchanges data with a graphics processing unit (GPU) across a PCIe bus.

When data is transmitted across the data connector, that data must adhere to a specific "communication protocol" associated with the data connector. A communication protocol usually specifies a set of packet types that can be transmitted across the data connector. Processing units that exchange data using the data connector, such as the CPU and GPU in the example above, must be configured to format data that is to be sent across the data connector based on one of the available packet types.

A conventional GPU is typically fabricated with hardwired logic that supports the communication protocol currently in use by a given data connector and allows the GPU to generate the various available packet types. That communication protocol is constantly evolving, though, and occasionally certain enhancements are released which introduce a new packet type (or types) into the protocol. When this situation occurs, a GPU that is already on the market lacks the hardwired logic required to generate the new packet type. Consequently, an updated GPU may be put into production that includes redesigned logic that supports the enhanced communication protocol and is capable of generating the new packet type.

Problems arise, however, due to the long production cycle usually needed to bring a GPU to market. A typical production cycle can last as long as two years, and during that time any number of additional enhancements to the communication protocol may be released, introducing even more new packet types into the protocol. Thus, when an updated GPU is put into production to add support for a given enhancement, additional enhancements may be released mid-production cycle that cannot be supported by the hardwired logic within the GPU. Accordingly, by the time the "updated" GPU is actually released to the market, that GPU would appear to be outdated. Releasing a GPU that only supports an older communication protocol makes that GPU less marketable and reflects poorly on the manufacturer of the GPU.

Accordingly, what is needed in the art is a technique that enables GPUs already out on the market to support updated communication protocols.

SUMMARY OF THE INVENTION

One embodiment of the present invention sets forth a method for transmitting packets from a first hardware unit to a second hardware unit across a data connector, including receiving a first signal that corresponds to a first packet type and reading a first packet specification from a software register, where the first packet specification defines the first packet type. The method further includes generating a packet according to the first packet type based on the first packet specification, and causing the packet to be transmitted from the first hardware unit to the second hardware unit across the data connector.

Advantageously, support for new packet types can be added to a processing unit or other type of hardware unit at any stage of production (including post-release) simply by updating software associated with the processing unit. Accordingly, situations where enhancements to the communication protocol make a given processing unit outdated can be entirely avoided. Thus, processing units no longer need to be released to market without having support for the most recent communication protocol.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
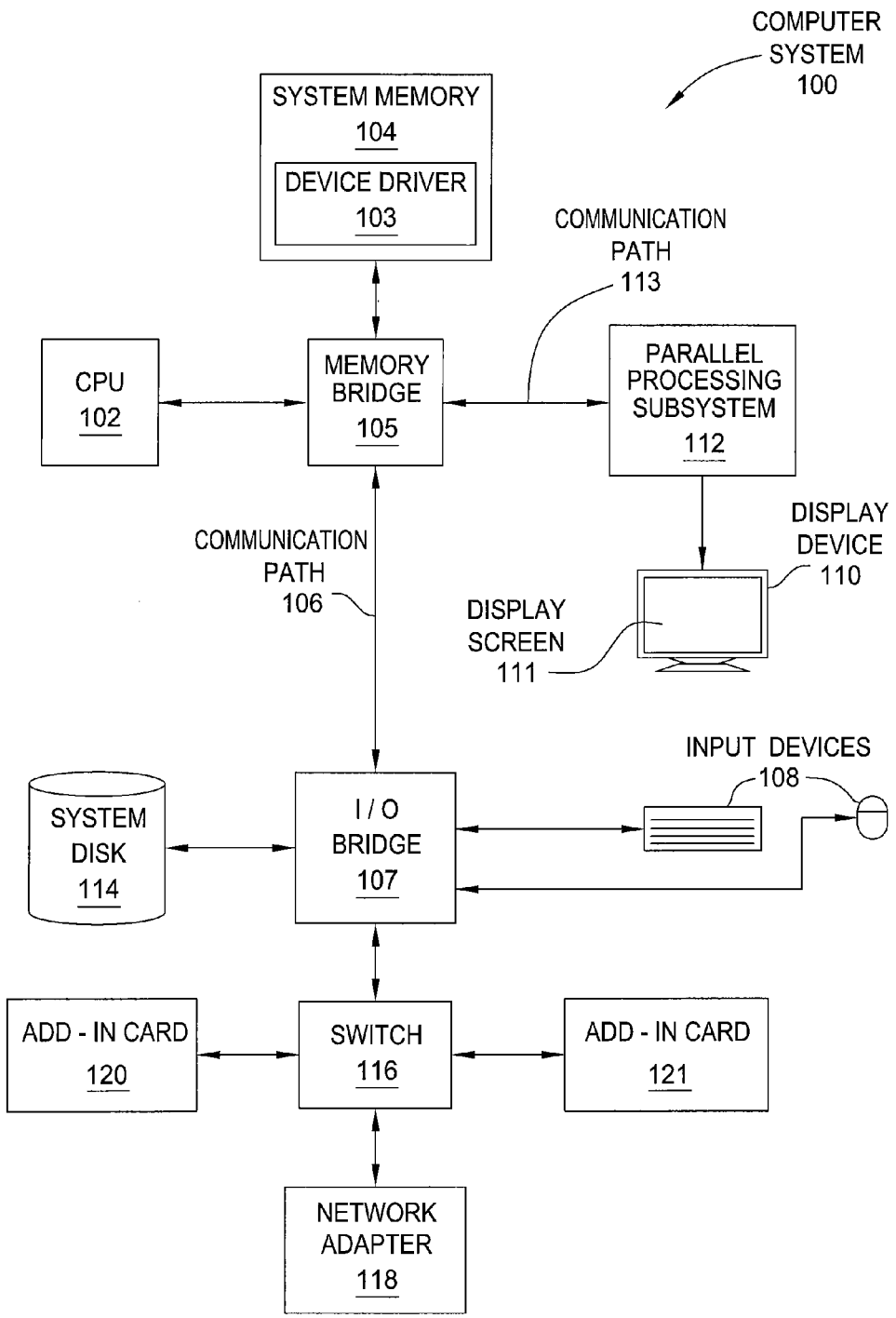
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 that includes a device driver 103. CPU 102 and system memory 104 communicate via an interconnection path that may include a memory bridge 105. Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interconnect (PCI) express, Accelerated Graphics Port (AGP), or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI, PCI Express (PCIe), AGP, HyperTransport, or any other bus or point-to-point communication protocol(s), and connections between different devices may use different protocols as is known in the art.

As described in greater detail below in conjunction with FIGS. 3-4, PPU 112 is configured to execute a software application, such as e.g. device driver 103, that allows PPU 112 to generate arbitrary packet types that can be transmitted across communication path 113. Those packet types are specified by the communication protocol used by communication path 113. In situations where a new packet type is introduced into the communication protocol (e.g., due to an enhancement to the communication protocol), PPU 112 can be configured to generate packets based on the new packet type and to exchange data with CPU 102 (or other processing units) across communication path 113 using the new packet type.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
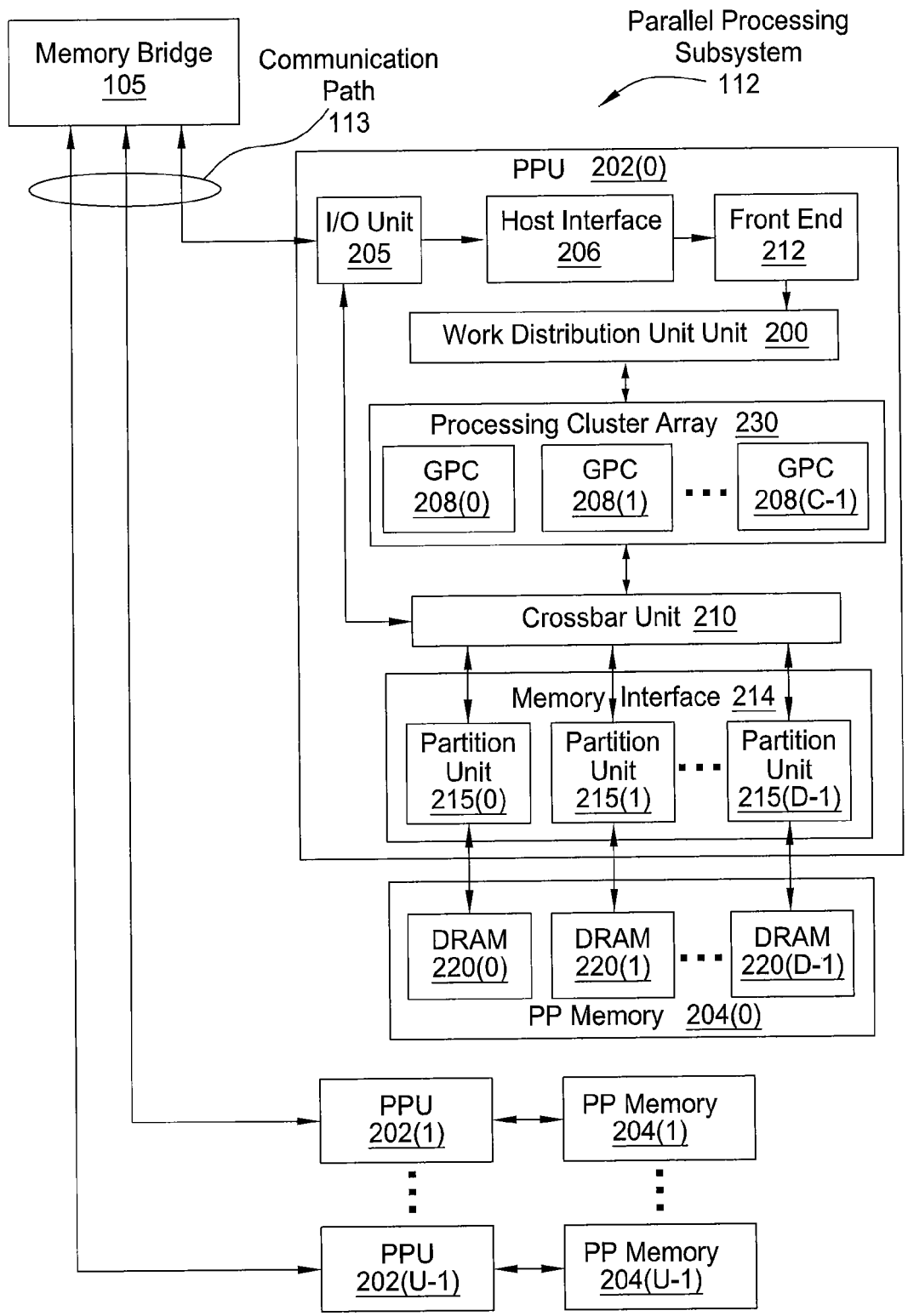
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCIe link, in which dedicated lanes are allocated to each PPU 202, as is known in the art. Other communication paths may also be used. As mentioned above, the contraflow interconnect (discussed below in conjunction with FIGS. 3A-4) may also be used to implement the communication path 113, as well as any other communication path within the computer system 100, CPU 102, or PPU 202. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D 1. As shown, the number of partition units 215 generally equals the number of DRAM 220. In other embodiments, the number of partition units 215 may not equal the number of memory devices. Persons skilled in the art will appreciate that dynamic random access memories (DRAMs) 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCIe) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Generating Arbitrary Packet Types

Figure 3:
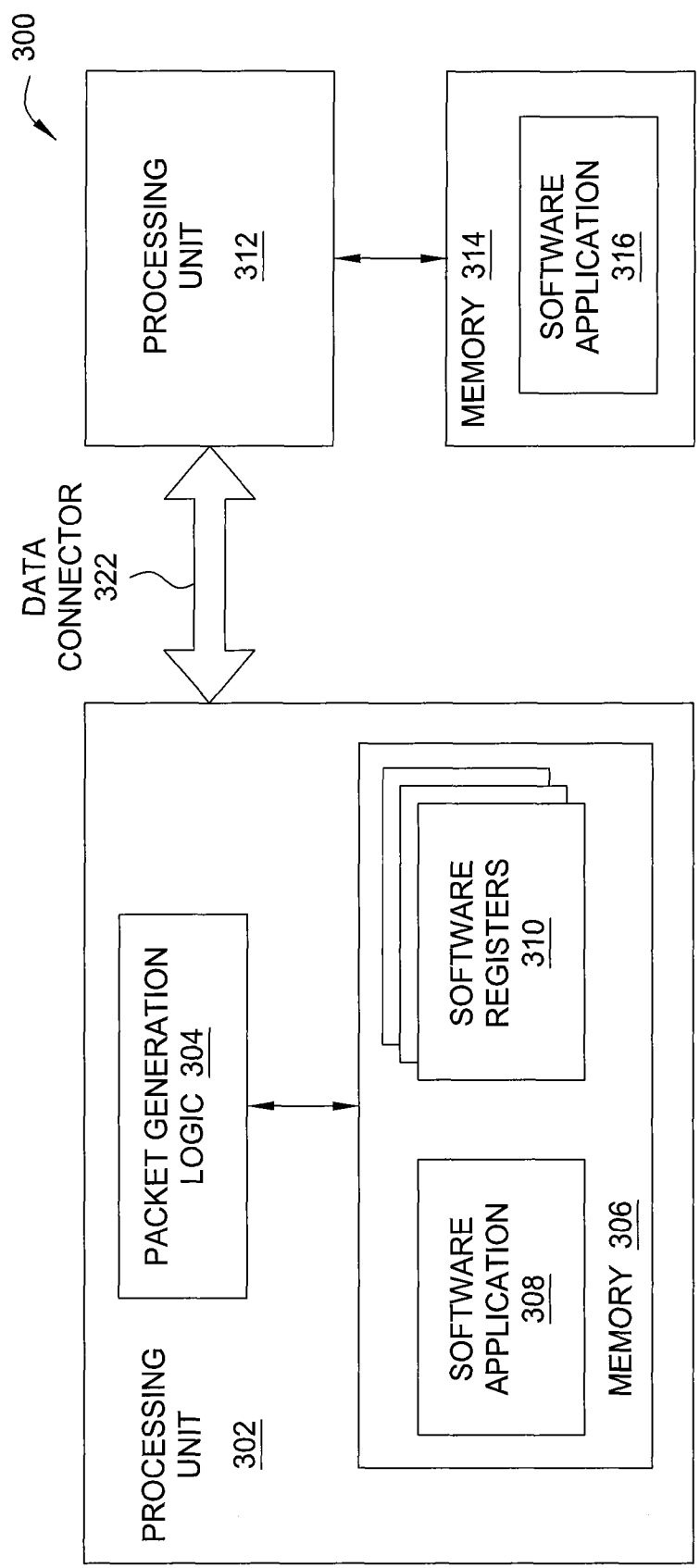
FIG. 3 is a block diagram that illustrates processing units coupled together with a data connector, according to one embodiment of the present invention.

FIG. 3 is a block diagram that illustrates processing units 302 and 312 coupled together with a data connector 322, according to one embodiment of the present invention. Each of processing units 302 and 312 could be, e.g., a CPU, a GPU, a parallel processing unit (PPU), or any combination of devices capable of processing data. In one embodiment, processing unit 302 is implemented by parallel processing subsystem 112 and processing unit 312 is implemented by CPU 102 (both shown in FIG. 1). In another embodiment, processing units 302 and 312 are included within a handheld computing device, such as a mobile phone, tablet computer, and the like.

Data connector 322 is a bus that allows processing units 302 and 312 to exchange data with one another. Data connector 322 could be, for example, a PCIe bus or a universal serial bus (USB), among others. Data connector 322 supports a particular communication protocol that processing units 302 and 312 implement in order to transmit data, in the form of packets, across data connector 322. In one embodiment, data connector 322 is a PCIe bus and supports a communication protocol established by the PCIe specification.

Processing unit 312 is coupled to a memory 314 that includes a software application 316. Memory 314 may be any technically type of memory module, such as, e.g., a hard disk, a RAM module, a ROM module, etc. Processing unit 312 may be configured to receive packets transmitted by processing unit 302 across data connector 322 and to decode those packets based on the communication protocol implemented by data connector 322.

As shown, processing unit 302 includes packet generation logic 304 coupled to a memory 306 that includes a software application 308 and one or more software registers 310. Packet generation logic 304 may be an embedded microprocessor, an application specific integrated circuit (ASIC), a collection of logic gates, or another type of device capable of processing data. Memory 306 could be, e.g., a RAM module, a set of hardware registers, a collection of different memory modules, or any other technically feasible type of module capable of storing data.

Packet generation logic 304 is configured to generate arbitrary types of packets that can be transmitted across data connector 322 to processing unit 312 based on packet specifications stored in software registers 310. In order to generate a packet of a given type, packet generation logic 304 reads the specification for the desired type of packet from software registers 310 and then generates a packet of the desired type based on that specification. During operation of processing unit 302, either a hardware trigger or a software trigger may occur that causes packet generation logic 304 to generate a packet of a given type and to then transmit that packet across data connector 322 to processing unit 312. A hardware trigger could be, for example, a signal originating from a hardware element embedded within processing unit 302, while a software trigger could be, e.g., a signal originating from a software application executing on processing unit 302.

Packet specifications stored in software registers 310 could be written to those registers through any number of different techniques. In one embodiment, processing unit 312 executes device driver 103 shown in FIG. 1 in order to write packet specifications to software registers 310 when processing unit 302 is brought online. In another embodiment, processing unit 302 executes software application 308 in order to write packet specifications to software registers 310. In yet another embodiment, processing unit 312 executes software application 316 residing in memory 314 in order to write packet specifications to software registers 310 across data connector 322. In yet another embodiment, processing unit 302 executes software application 316 in order to write packet specifications to software registers 310 upon receiving that software application across data connector 322.

In various other embodiments, the specification for a given packet type may include a mapping to specific hardware and/or software triggers. In this embodiment, packet generation logic 304 generates the given packet type in response to the specific hardware or software trigger indicated by the specification for that packet type. For example, packet generation logic 304 could receive a specific hardware or software trigger, identify a particular packet specification that maps to the received hardware or software trigger, and then generate and transmit a packet based on the identified packet specification.

In some situations, the communication protocol implemented by data connector 322 may be enhanced to include new packet types. For example, when data connector 322 is a PCIe bus, enhancements made to the PCIe specification could introduce new packet types into the communication protocol implemented by data connector 322, thereby making provisions for new types of packets that could be transmitted across data connector 322.

When arbitrary new packet types are introduced into this communication protocol, device driver 103 or software applications 308 or 316 may be modified (i.e., updated by a software designer) to include specifications of the new packet types. Device driver 103 or software applications 308 or 316 may then be executed by a relevant processing unit (302 or 312) in order to write specifications of the new packet types to software registers 310. Packet generation logic 304 may then be configured to generate packets according to the new packet type(s) and to cause those packets to be transmitted across data connector 322. Accordingly, the functionality of processing unit 302 may be expanded to include support for new packet types by updating a particular software application/device driver.

By implementing the techniques described above, processing unit 302 can be configured to simulate the use of an enhanced communication protocol by updating one of device driver 103 or software applications 308 or 316. In addition, when processing unit 312 already supports the enhanced communication protocol, the aforementioned techniques allow the behavior of processing unit 302 to be characterized when exchanging data with processing unit 312 using the enhanced protocol. Further, adding support for a given protocol enhancement allows the manufacturer of processing unit 302 to advertise that processing unit as providing support for the enhanced communication protocol, thereby increasing the marketability of processing unit 302.

In one embodiment, the functionality performed by processing unit 302 may be performed by another type of hardware unit that (i) is compatible with the communication protocol associated with data connector 322, (ii) includes packet generation logic 304 and software registers 310, and (iii) is capable of causing new types of packets (such as those specified by packet specifications within software registers) to be transmitted across data connector 322. The hardware unit performing the functionality of processing unit 302 in this embodiment could be, e.g., a hard disk drive, a printed circuit board, or a video card, among other types of hardware devices. In a further embodiment, the functionality of processing unit 312 may be performed by any type of hardware unit that is compatible with the communication protocol associated with data connector 322. In various other embodiments, packet generation logic 304 within processing unit 302 comprises (i) a hardwired circuit configured to perform the functionality discussed above or (ii) a processing unit configured to execute a software application in order to perform the functionality discussed above.

Figure 4:
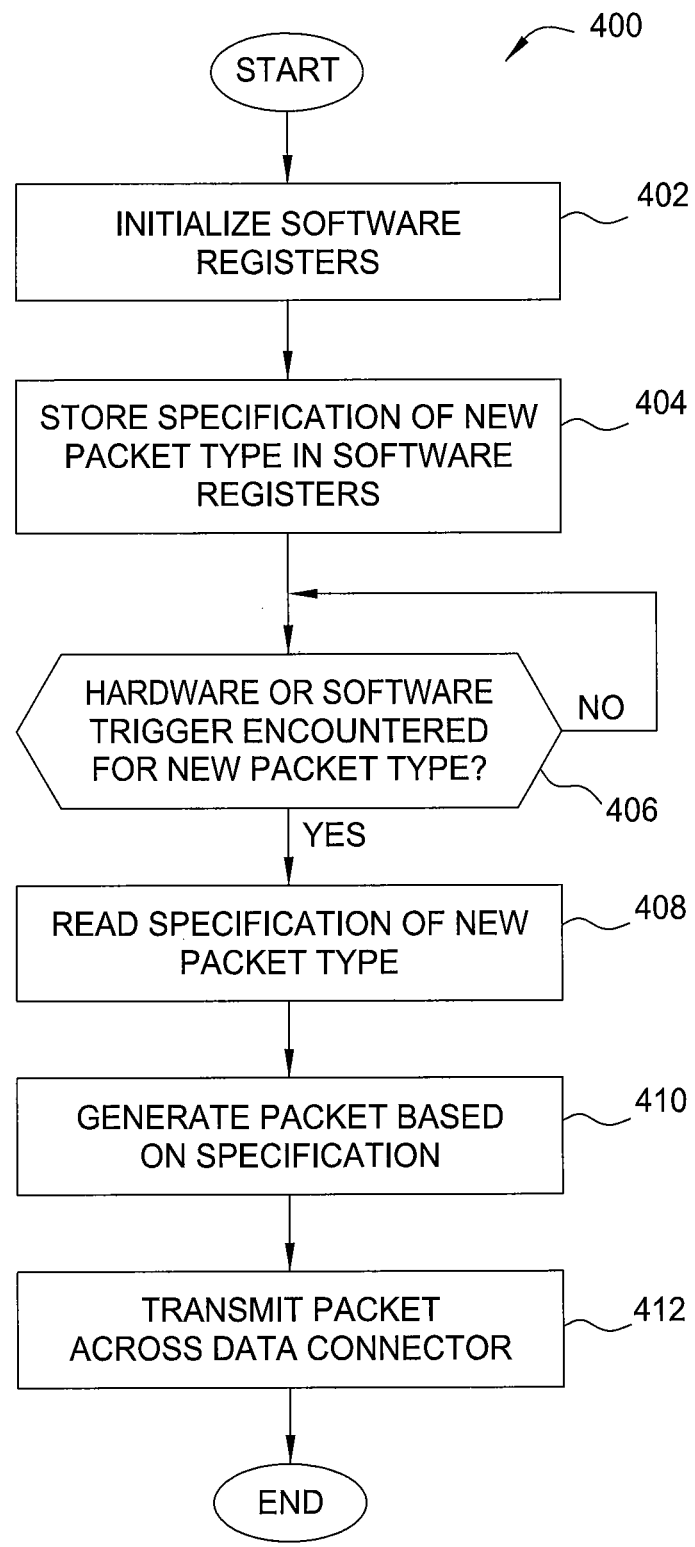
FIG. 4 is a flowchart of method steps for transmitting an arbitrary message across the data connector of FIG. 3.

FIG. 4 is a flowchart of method steps for transmitting an arbitrary packet type across the data connector 322 of FIG. 3. Although the method 400 is described in conjunction with the systems of FIGS. 1-3, persons skilled in the art will understand that any system configured to perform the method steps, in any order, is within the scope of the invention. Processing unit 302 is configured to perform the various steps of the method 400 when executing device driver 103, software application 308, or software application 316. In one embodiment, processing unit 312 may perform some of the steps of the method 400.

As shown, the method 400 begins at step 402, where processing unit 302 initializes software registers 310. In doing so, processing unit 302 may allocate a certain amount of memory to each of software registers 310. At step 404, processing unit 302 causes specifications of new packet types ("packet specifications") to be stored within software registers 310. Those specifications could be defined within device driver 103, software application 308, or software application 316.

In one embodiment, processing unit 312 executes device driver 103 shown in FIG. 1 in order to write packet specifications to software registers 310 when processing unit 302 is brought online. In another embodiment, processing unit 302 executes software application 308 in order to write packet specifications to software registers 310. In yet another embodiment, processing unit 312 executes software application 316 residing in memory 314 in order to write packet specifications to software registers 310 across data connector 322. In yet another embodiment, processing unit 302 executes software application 316 in order to write packet specifications to software registers 310 upon receiving that software application across data connector 322.

At step 406, packet generation logic 304 within processing unit 302 waits until a hardware or software trigger is encountered for one of the new packet types defined by the packet specifications stored in software registers 310. A hardware trigger could be, for example, a signal originating from a hardware element embedded within processing unit 302, while a software trigger could be, e.g., a signal originating from a software application executing on processing unit 302. In one embodiment, the specification for a given packet type may include a mapping between that packet type and one or more specific hardware or software triggers.

At step 408, packet generation logic 304 reads the specification for the new packet type associated with the hardware or software trigger. At step 410, packet generation logic 304 generates a packet based on the packet specification associated with the hardware or software trigger. At step 412, packet generation logic 304 transmits the packet across data connector 322.

By implementing the method 400, packet generation logic 304 may generate and transmit an arbitrary packet type across data connector 322, the packet type being defined by a packet specification stored within software registers 310.

In sum, a processing unit exchanges data with another processing unit across a data connector that supports a particular communication protocol. When the communication protocol is updated to support a new packet type, a specification of that new packet type may be stored within software registers included within the processing unit. Under circumstances that require the use of the new packet type, packet generation logic may read the specification of the new packet type, then generate and transmit a packet of the new type.

Advantageously, support for new packet types can be added to a processing unit at any stage of production (including post-release) simply by updating software associated with the processing unit. Accordingly, situations where enhancements to the communication protocol make a given processing unit outdated can be entirely avoided. Thus, processing units no longer need to be released to market without having support for the most recent communication protocol.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes, may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for transmitting packets from a first hardware unit to a second hardware unit across a data connector, the method comprising:
receiving a first signal that corresponds to a first packet type;
reading a first packet specification from a software register, wherein the first packet specification defines the first packet type;
generating a packet according to the first packet type based on the first packet specification; and
causing the packet to be transmitted from the first hardware unit to the second hardware unit across the data connector.

2. The computer-implemented method of claim 1, wherein the first hardware unit writes the first packet specification to the software register.

3. The computer-implemented method of claim 1, wherein the second hardware unit writes the first packet specification to the software register across the data connector.

4. The computer-implemented method of claim 1, wherein the first packet specification includes a mapping from the first signal to the first packet type, and reading the first packet specification comprises identifying the first packet specification as including the mapping from the first signal to the first packet type.

5. The computer-implemented method of claim 1, wherein the data connector comprises a peripheral component interconnect express (PCIe) or a universal serial bus (USB).

6. The computer-implemented method of claim 1, wherein the first hardware unit comprises a graphics processing unit (GPU), and the second hardware unit comprises a central processing unit (CPU).

7. The computer-implemented method of claim 1, wherein the first signal originates from a hardware element embedded within the first hardware unit or from a software application executing on the first hardware unit.

8. A subsystem included within a first hardware unit and configured to cause packets to be transmitted from the first hardware unit to a second hardware unit across a data connector by performing the steps of:
receiving a first signal that corresponds to a first packet type;

reading a first packet specification from a software register included within the first hardware unit, wherein the first packet specification defines the first packet type;

generating a packet according to the first packet type based on the first packet specification; and causing the packet to be transmitted from the first hardware unit to the second hardware unit across the data connector.

9. The subsystem of claim 8, wherein the first hardware unit writes the first packet specification to the software register.

10. The subsystem of claim 8, wherein the second hardware unit writes the first packet specification to the software register across the data connector.

11. The subsystem of claim 8, wherein the first packet specification includes a mapping from the first signal to the first packet type, and the step of reading the first packet specification comprises identifying the first packet specification as including the mapping from the first signal to the first packet type.

12. The subsystem of claim 8, wherein the data connector comprises a peripheral component interconnect express (PCIe) or a universal serial bus (USB).

13. The subsystem of claim 8, wherein the first hardware unit comprises a graphics processing unit (GPU), and the second hardware unit comprises a central processing unit (CPU).

14. The subsystem of claim 8, wherein the first signal originates from a hardware element embedded within the first hardware unit or from a software application executing on the first hardware unit.

15. A computing device, including:
a first hardware unit that includes a first subsystem;
a second hardware unit; and
a data connector that couples together the first hardware unit and the second hardware unit, wherein the first subsystem within the first hardware unit is configured to cause packets to be transmitted from the first hardware unit to the second hardware unit across the data connector by:
receiving a first signal that corresponds to a first packet type,
reading a first packet specification from a software register included within the first hardware unit, wherein the first packet specification defines the first packet type,
generating a packet according to the first packet type based on the first packet specification, and
causing the packet to be transmitted from the first hardware unit to the second hardware unit across the data connector.

16. The computing device of claim 15, further including:
a memory coupled to the first subsystem and storing program instructions that, when executed by the first subsystem, cause the first subsystem to:
receive the first signal,
read the first packet specification from the software register,
generate the packet according to the first packet type, and
cause the packet to be transmitted from the first hardware unit to the second hardware unit across the data connector.

17. The computing device of claim 15, wherein the first hardware unit writes the first packet specification to the software register, or the second hardware unit writes the first packet specification to the software register across the data connector.

18. The computing device of claim 15, wherein the first packet specification includes a mapping from the first signal to the first packet type, and reading the first packet specification comprises identifying the first packet specification as including the mapping from the first signal to the first packet type.

19. The computing device of claim 15, wherein the first hardware unit comprises a graphics processing unit (GPU), the second hardware unit comprises a central processing unit (CPU), and the data connector comprises a peripheral component interconnect express (PCIe) or a universal serial bus (USB).

20. The computing device of claim 15, wherein the first signal originates from a hardware element embedded within the first hardware unit or from a software application executing on the first hardware unit.

* * * * *